(12) United States Patent
Shi

(10) Patent No.: US 11,884,509 B2
(45) Date of Patent: Jan. 30, 2024

(54) HOLOGRAPHIC EXTERNAL CALLING DEVICE FOR ELEVATOR

(71) Applicant: Yesar Electronics Technology (Shanghai) Co., Ltd., Shanghai (CN)

(72) Inventor: Jinghua Shi, Shanghai (CN)

(73) Assignee: Yesar Electronics Technology (Shanghai) Co., Ltd., Shanghai (CN)

( * ) Notice: Subject to any disclaimer, the term of this patent is extended or adjusted under 35 U.S.C. 154(b) by 210 days.

(21) Appl. No.: 17/020,155

(22) Filed: Sep. 14, 2020

(65) Prior Publication Data
US 2021/0403280 A1 Dec. 30, 2021

(30) Foreign Application Priority Data
Jun. 29, 2020 (CN) .......................... 202021234741.3

(51) Int. Cl.
*B66B 1/46* (2006.01)
*F16M 13/02* (2006.01)
*G06F 3/01* (2006.01)
*G03H 1/00* (2006.01)

(52) U.S. Cl.
CPC .............. *B66B 1/468* (2013.01); *F16M 13/02* (2013.01); *G03H 1/0005* (2013.01); *G06F 3/017* (2013.01); *B66B 2201/4638* (2013.01); *G03H 2001/0061* (2013.01)

(58) Field of Classification Search
CPC ......... B66B 1/3446; B66B 1/468; B66B 1/50; B66B 1/52; B66B 2201/4638; B66B 2201/4623; B66B 2201/4646; F16M 13/02; G03H 1/2294; G03H 1/0005; G03H 2001/0061; G03H 2226/05; G06F 3/017
See application file for complete search history.

(56) References Cited

U.S. PATENT DOCUMENTS

| 10,275,098 B1* | 4/2019 | Clements ............... G02B 30/56 |
| 2018/0273345 A1 | 9/2018 | Rao et al. |

FOREIGN PATENT DOCUMENTS

CN 201520339763 11/2015

OTHER PUBLICATIONS

Neonode Inc., "N Neonode's Holographic Contactless Touch for Elevators", Youtube, https://www.youtube.com/watch?v=sKT_sAKFO38, Apr. 2, 2020.
Patrick Mannion, "Neonode demos holographic human-machine interface at Sensors Expo 2019", Youtube, https://www.youtube.com/watch?v=q1qTXx2dLM Jul. 2, 2019.

* cited by examiner

*Primary Examiner* — Yaron Cohen

(57) ABSTRACT

A holographic external call device for an elevator, which includes a device shell. One side of the device shell is provided with a sensor mounting hole, and a gesture sensor is installed in the sensor mounting hole. An optical module is installed, one side of the optical module is provided with two screen installation grooves, the two screen installation grooves are both installed with a screen, and the bottom side of the optical module is provided with a main board. The screen produces an image after power on, which affects the light reconstruction in the optical module to generate an image in the air, and then the finger clicks on the image in the air. The gesture sensor will sense the gesture and send the command for the main board, addressing cross-contact infection problem caused by using the elevator outbound button to call the elevator without actual physical contact.

7 Claims, 3 Drawing Sheets

HOLOGRAPHIC EXTERNAL CALLING DEVICE FOR ELEVATOR

CROSS-REFERENCE

This application claims the benefit of priority to CN Utility Model Patent Application No. 202021234741.3, filed Jun. 29, 2020, the contents of which are herein incorporated by reference into the Detailed Description herein below.

TECHNICAL FIELD

Example embodiments relate to the technical field of elevator external call, in particular to a holographic external call device for elevator.

TECHNICAL BACKGROUND

The current elevator external call is mainly installed in the elevator hall, which is composed of a display screen and physical up and down buttons. When using the elevator, people use the elevator outbound call in the elevator hall and press the physical button to send a signal to the elevator control system to realize the function of calling the elevator.

However, when people use it, their fingers must be in direct physical contact with the elevator buttons. The elevator is a public equipment, and the buttons are full of bacteria and germs. Then people click the buttons and cause cross infection, especially the novel coronavirus in 2020. The novel coronavirus reflects the importance of non-contact in public places, so a holographic outbound device for elevators is needed to meet people's needs. Especially in 2020, the global novel coronavirus phenomenon was more and more serious. The virus also showed the importance of non-contact in public places. Therefore, we need a holographic devices elevator to meet peoples' needs.

SUMMARY

The purpose of example embodiments is to provide a holographic external call device for elevators to solve the problem that when people use the elevator buttons, their fingers must be in direct physical contact with the elevator buttons. The elevator belongs to public equipment, and the buttons are full of bacteria and germs. Then people are clicking at the same time, causing the problem of cross infection.

In order to achieve the above objective, example embodiments provide the following technical solutions: a holographic external call device for elevators, comprising a device housing, one side of the device housing is provided with a sensor mounting hole, a gesture sensor is installed in the sensor mounting hole, and the device housing An optical module is installed inside, two screen installation slots are opened on one side of the optical module, and screens are installed in the two screen installation slots, the bottom side of the optical module is provided with a main board, and the main board is located in the device housing, A device mounting plate is installed on the bottom side of the device housing, and the device mounting plate is matched with the device housing.

Preferably, fixing plates are fixedly installed on both sides of the device housing, and fixing holes are opened on one side of the two fixing plates.

Preferably, a reinforcing rib is fixedly installed on one side of the fixing plate.

Preferably, a plurality of first connecting blocks are installed on one side of the device mounting plate, a plurality of second connecting blocks are installed on one side of the device housing, and the plurality of first connecting blocks are respectively suitable for the plurality of second connecting blocks.

The beneficial effects: In example embodiments, the screen produces an image after power on, which affects the light reconstruction in the optical module to generate an image in the air, and then the finger clicks on the image in the air. At this time, the gesture sensor in the device will sense the gesture and send the command to the main board and the main board send one signal to the screen, the screen content changes, and feedback to the user, forming a closed loop of human-computer interaction, and one signal is sent to the elevator control system to tell the control system that someone is going to take the elevator. After the above process, we realize the function of clicking the image in the air to call the elevator to call the floor;

In example embodiments, compared with the existing elevator external call solution, this solution solves the problem of cross-contact infection caused when the elevator external call button is used to call the elevator. Clicking and touching the image in the air does not require actual physical contact, you can realize the function of calling the elevator and avoid the problems caused by indirect contact.

In the figures: 1. Device shell; 2. Device mounting plate; 3. Sensor mounting hole; 4. Gesture sensor; 5. Optical module; 6. Screen mounting slot; 7. Screen; 8. Main board; 9. First connecting block; 10. Second connecting block; 11. Fixing plate.

DETAILED DESCRIPTION

The following will clearly and completely describe the technical solutions in the example embodiments in conjunction with the accompanying drawings in the example embodiments. Obviously, the described embodiments are only a part of the example embodiments, not all examples.

Figure 1:
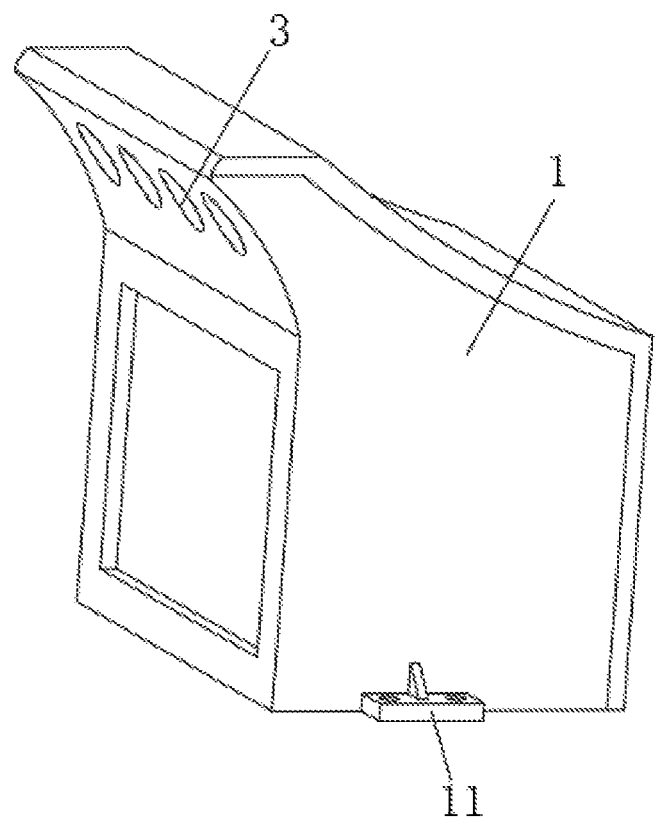
FIG. 1 is a three-dimensional structural diagram of a holographic external calling device for elevators in accordance with an example embodiment.
Figure 2:
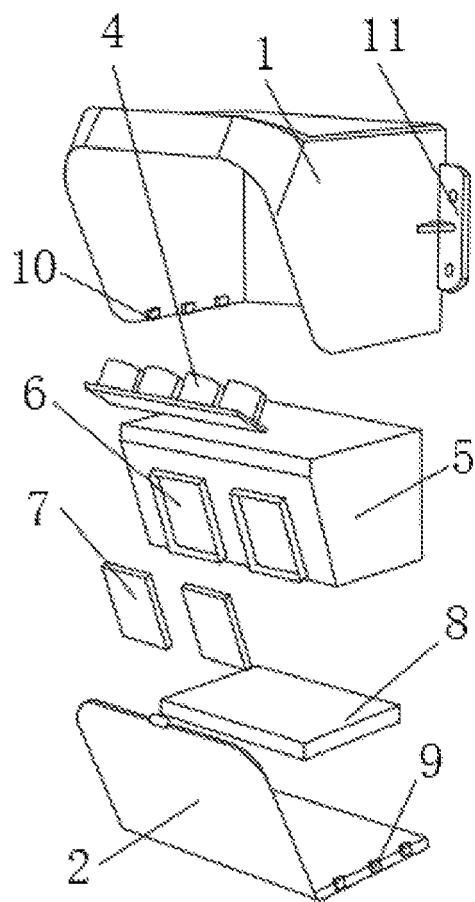
FIG. 2 is an exploded view of the holographic external calling device for elevators.
Figure 3:
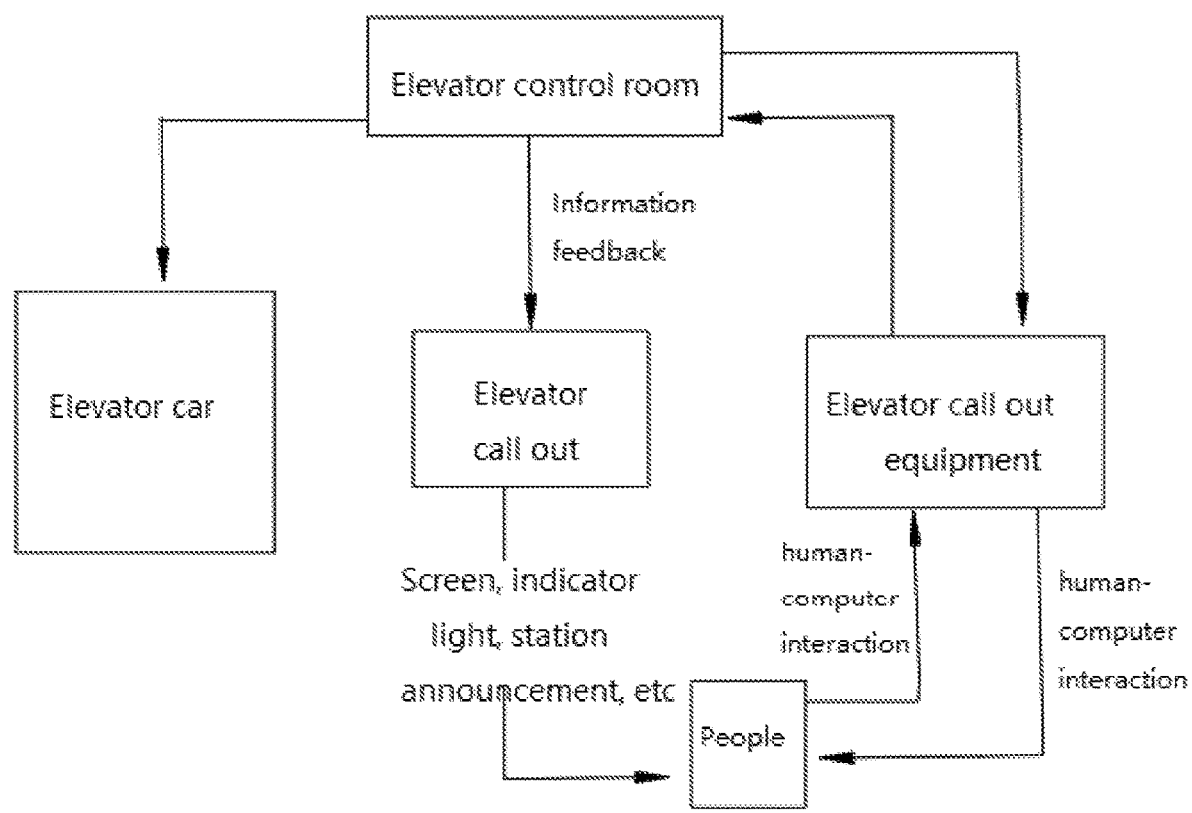
FIG. 3 is a schematic structural diagram of the elevator system control flow chart of a holographic external call device for elevators in accordance with an example embodiment.

Referring to FIGS. 1-3, a holographic external call device for elevators includes a device housing 1, a sensor mounting hole 3 is opened on one side of the device housing 1, a gesture sensor 4 is installed in the sensor mounting hole 3, and the device housing 1 is installed optical module 5, one side of the optical module 5 is provided with two screen mounting slots 6, and the screen 7 is installed in the two screen mounting slots 6, the bottom side of the optical module 5 is provided with a main board 8, which is located in the device. Inside the device housing 1, a device mounting board 2 is installed on the bottom side of the device housing 1. The device mounting board 2 is adapted to the device housing 1. The holographic external device is used to generate images in the air, and touch-free clicks and other gesture operations are performed. Elevator interaction realizes the function of contactless calling elevator.

In an example embodiment, both sides of the device housing 1 are fixedly installed with fixing plates 11, and fixing holes are opened on one side of the two fixing plates 11. The fixing plate 11 and the fixing holes on the fixing plate 11 are arranged to facilitate the installation of the device. The housing 1 is fixedly installed in the elevator, which is convenient for installation. In the present invention, a reinforcing rib is fixedly installed on one side of the fixed plate 11.

In an example embodiment, a plurality of first connecting blocks 9 are installed on one side of the device mounting plate 2, and a plurality of second connecting blocks 10 are installed on one side of the device housing 1. The two connecting blocks 10 are matched, and the device housing 1 and the device mounting board 2 are connected by a plurality of first connecting blocks 9 and a plurality of second connecting blocks 10, and it is convenient to remove when the internal installation and maintenance are required.

After the screen 7 is powered on, an image is generated, which affects the light reconstruction in the optical module 5 to generate an image in the air, and then the finger clicks on the image in the air. At this time, the gesture sensor 4 in the device will sense the gesture and send the command to the main board 8. The main board 8 sends a signal: a signal is sent to the screen 7, the content of the screen 7 changes, and the feedback is given to the user, forming a closed loop of human-computer interaction, and a signal is sent to the elevator control system to tell the control system that someone is going to take the elevator and go through the above process. We have realized the function of clicking the image in the air to call the elevator to call the floor. In the elevator scene, the holographic external device is used to generate the image in the air, and the touch-free click and other gesture operations are performed to interact with the elevator to achieve contact-free. The function of calling the elevator, the fixed plate 11 and the fixing holes on the fixed plate 11 are arranged to facilitate the fixed installation of the device casing 1 in the elevator, and the installation is convenient, and the device casing 1 and the device mounting plate 2 pass through a plurality of first connecting blocks 9. It is connected with a plurality of second connecting blocks 10, and it is convenient to dismantle when internal installation and maintenance are required.

The above are only the preferred specific embodiments, but the protection scope is not limited to this. Anyone familiar with the technical field within the technical scope of the present disclosure, according to the present claims. The technical solution of the new type and the concept to be equivalently replaced or changed shall be covered by the scope of protection of the claims.

What is claimed is:

1. A holographic external calling device for an elevator, including:
    a device shell, wherein: one side of the device shell is provided with one or more sensor mounting holes, one or more gesture sensors are installed in the one or more sensor mounting holes, an optical module is installed in the device shell, and two screen mounting slots are arranged on one side of the optical module, a screen is installed in the two screen mounting slots for generating a first image, a bottom side of the optical module is provided with a main board, the main board is located in the device shell, and a device mounting plate is installed on the bottom side of the device shell, and the device mounting plate is matched with the device shell,
    wherein the optical module is configured to reconstruct light of the first image to generate a second image in the air,
    wherein the one or more gesture sensors are configured to sense a gesture of a user to make a selection on the air of the second image, and in response to sensing the gesture, send a command to the main board,
    wherein in response to receiving the command, the main board is configured to send a signal to a control system of the elevator based on the selection,
    wherein the one side of the device shell with the one or more sensor mounting holes is protruding and forms an obtuse angle with the screen, and wherein the one or more sensor mounting holes point across the second image in the air.

2. The holographic external calling device according to claim 1, further comprising fixing plates fixedly installed on both sides of the device housing, and one side of each fixing plating is provided with fixing holes.

3. The holographic external calling device according to claim 2, wherein one side of each fixed plate is fixedly installed with a reinforcing rib.

4. The holographic external calling device according to claim 1, further comprising a plurality of first connection blocks installed on one side of the device mounting plate, and a plurality of second connection blocks installed on one side of the device shell, and the plurality of first connection blocks are respectively adapted to the plurality of second connection blocks.

5. The holographic external calling device according to claim 1, wherein the main board is configured to send a second signal to the screen to indicate the selection of the user.

6. The holographic external calling device according to claim 1, wherein the main board provides a feedback to the user to indicate the selection of the user.

7. The holographic external calling device according to claim 1, wherein the one or more sensor mounting holes comprise a plurality of sensor mounting holes, wherein the one or more gesture sensors comprise a plurality of gesture sensors each in one of the sensor mounting holes and each point across the second image in the air.

* * * * *